United States Patent [19]
Scott et al.

[11] Patent Number: 6,097,381
[45] Date of Patent: Aug. 1, 2000

[54] METHOD AND APPARATUS FOR SYNTHESIZING REALISTIC ANIMATIONS OF A HUMAN SPEAKING USING A COMPUTER

[75] Inventors: Kenneth C. Scott, La Crescenta; Matthew C. Yeates, Montrose; David S. Kagels; Stephen Hilary Watson, both of Pasadena, all of Calif.

[73] Assignee: California Institute of Technology, Pasadena, Calif.

[21] Appl. No.: 09/074,768

[22] Filed: May 8, 1998

Related U.S. Application Data

[63] Continuation of application No. 08/351,218, Nov. 30, 1994.
[51] Int. Cl.[7] .................................................. G06T 15/00
[52] U.S. Cl. .......................................... 345/302; 345/473
[58] Field of Search .................................... 345/202, 473, 345/474, 475, 121; 704/1, 276

[56] References Cited

U.S. PATENT DOCUMENTS

| | | | |
|---|---|---|---|
| 5,358,259 | 10/1994 | Best | 463/31 |
| 5,657,426 | 8/1997 | Waters et al. | 704/276 |
| 5,734,923 | 3/1998 | Sagawa et al. | 345/302 |
| 5,799,267 | 8/1998 | Siegel | 704/1 |
| 5,878,396 | 3/1999 | Henton | 704/276 |

OTHER PUBLICATIONS

Terzopoulos et al., "Analysis and Synthesis of Facial Image Sequences Using Physical and Anatomical Models", IEEE Transactions on Pattern Analysis and Machine Intelligence, vol. 15, No. 6, Jun. 1993, pp. 569–579.

Morishima et al., "An Intelligent Facial Image Coding Driven by Speech and Phoneme", ICASSP '89, Acoustics, Speech & Signal Processing, 1989, pp. 1795–1798.

*Primary Examiner*—Stephen S. Hong
*Attorney, Agent, or Firm*—Fish & Richardson P.C.

[57] ABSTRACT

A method and apparatus for synthesizing speech or facial movements to match selected speech sequences. A videotape of an arbitrary text sequence is obtained including a plurality of images of a user speaking various sequences. Video images corresponding to specific spoken phonemes are obtained. A video frame is digitized from that sequence which represents the extreme of mouth motion and shape. This is used to create a database of images of different facial positions relative to spoken phonemes and diphthongs. An audio speech sequence is then used as the element to which a video sequence will be matched. The audio sequence is analyzed to determine spoken phoneme sequences and relative timings. The database is used to obtain images for each of these phonemes and these times, and morphing techniques are used to create transitions between the images. Different parts of the images can be processed in different ways to make a more realistic speech pattern.

12 Claims, 4 Drawing Sheets

METHOD AND APPARATUS FOR SYNTHESIZING REALISTIC ANIMATIONS OF A HUMAN SPEAKING USING A COMPUTER

This application is a continuation of Ser. No. 08/351,218 filed Nov. 30, 1994.

FIELD OF THE INVENTION

The present invention defines techniques allowing a computer to simulate an animated image of a human speaking. More specifically, the present invention uses special techniques to simulate human facial expressions associated with various speaking patterns.

BACKGROUND AND SUMMARY OF THE INVENTION

Computer animation has been used to produce computer-generated pictures associated with various characteristics. Usually a computer animation is used to produce a moving animational system. As the users speak, their mouths move, but the movement of the mouths of the speakers and their speech has not been synchronized. This does not bother the viewer, however, since it appears to be a cartoon; and is not intended to be accurate.

The inventors of the present invention recognized that usual computer animation does not provide a sufficiently accurate picture of a user speaking to allow it to be used as a facsimile of that user speaking. That is, under the current state of the art, the inventors of the present invention recognized that a viewer of the computer animation would never be fooled into believing that the computer animation was real. They set about trying to find a way to solve this problem.

The inventors recognized, for the first time, that morphing technology could be used to simulate moving facial characteristics. Morphing technology is well known in the art: it is used to simulate a continuous change from a first image of a first object into an image of a second object. For example, it is easy to morph as apple into an orange. While one is looking at the apple, one sees its characteristics gradually change. It gradually assumes the shape of the orange, and also gradually assumes the color of the orange.

Morphing is well known, but a brief explanation of its operation will be given here anyway. Morphing involves transforming a first object, an "original object" into a second object, a "destination object". The computer takes the original object and the destination object, and maps various points thereof. These points define the shape and contour of both objects as well as the colors at the various points. Morphing can be carried out using a number of different techniques. For simplicity, we can assume that a small number of points, e.g., 16 points are used.

The morphing process is then calculated in advance: an interim point between the two objects is calculated, and then interim points between those objects are calculated. These interim points can be any points between the two objects. This provides a plurality of images, each image differing from the previous image by only a small amount, and each image incrementally closer to the destination image. By providing a number of images, over an amount of time, the difference between each two adjacent images is very small. The viewer sees the illusion of transformation from one image to another, and thus the user sees a continuously-varying image that changes gradually from the original image to the destination image. It appears as though the apple changes into the orange.

The inventors of the present invention were the first to realize that such morphing technology could be used to simulate an image of a human body part moving between a first position and a second position for computer animation purposes.

One specific aspect of the present invention is the use of morphing technology to change facial image characteristics in a way to simulate the characteristics of speech. To do this, the inventors of the present invention developed a plurality of tools which changed human facial expression in accordance with speech to be spoken. The detailed aspects will be described herein.

It is therefore an object of the present invention to provide a system and method which changes facial expressions of a user's body part, preferably a user's face, in a way that associates those facial expressions with speech.

BRIEF DESCRIPTION OF THE DRAWINGS

These and other aspects of the present invention will be described in detail with respect to the accompanying drawings, in which.

DESCRIPTION OF THE PREFERRED EMBODIMENTS

The system includes multiple embodiments, which represent progression between the various stages of complexity of the invention. The first embodiment is described herein with reference to FIGS. 1 and 2.

The preferred mode of this invention contemplates forming an animation sequence of face and head and shoulders of a subject speaking. More generally, however, the present invention could be used to form an animation sequence of any action taken by the subject using the same concepts as described herein. While all description is given for speech and facial movements, of course, this teaching could easily be adapted to any movement.

First Embodiment

Figure 1:
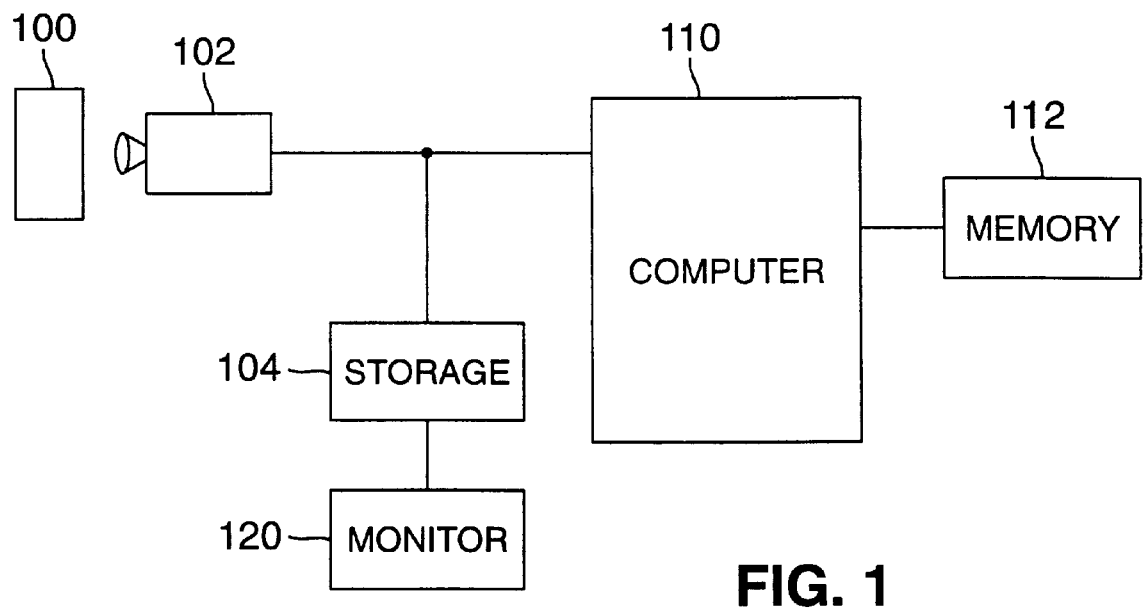
FIG. 1 shows a block diagram of the hardware used according to the present invention.

FIG. 1 shows a basic block diagram of the hardware used according to the invention. The subject 100 is located at a position where its image can be acquired by an image acquisition device 102, preferably a video camera with an associated image digitizer. The image digitizer can be an A66 and A25 device available from Abekas Video systems, Inc, Redwood City Calif. The Abekas Video Tools software allows the user to control the A66 from an SGI computer. The output of the image acquisition device is connected to a storage unit such as a video recorder or a dual port RAM or the like, and also to a computer 110, preferably a UNIX-based computer with an associated memory 112. The preferred mode uses a Silicon Graphics (SGI) Indigo2 Extreme. Alternately, the hardware used can be more dedicated hardware, such as an image processing digital signal processor ("DSP"), or even by LSI circuitry.

The storage device 104 is also connected to a monitor 120, from which video images indicative of those taken by the image acquisition device 102 may be displayed. The computer 110 may also have a direct connection to the monitor 120.

Figure 2:
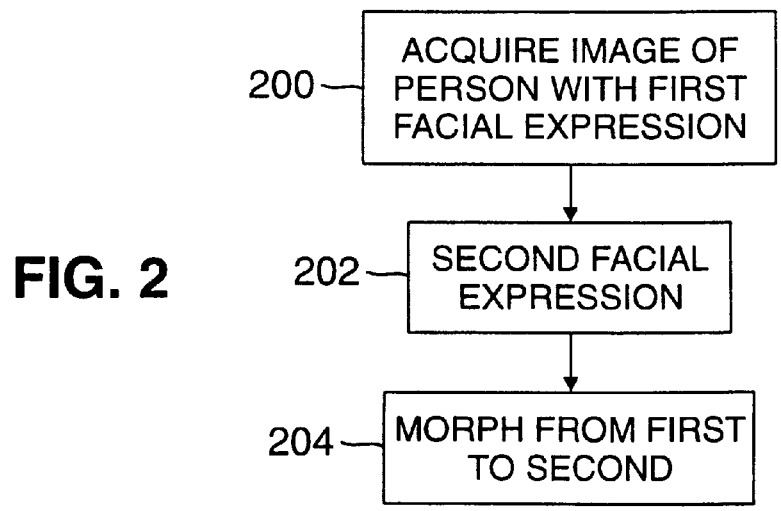
FIG. 2 shows a flowchart of operation of the first embodiment of the present invention.

For the first embodiment of the invention, the computer executes the flowchart of FIG. 2. At step 200, an image of a subject with a first facial expression is acquired and stored. This image is preferably a view of at least the head of the subject, and preferably the head and shoulders of the subject. For purposes of this example, we will assume that the person is saying the word "rain". Step 200 then acquires an image of the person saying the "r" part of the word rain. At step 202 a second facial expression is acquired. In this example, the second facial expression is an expression of the user saying the sound "n" to end the word rain, and showing the distortions of their facial expressions caused by the speaking.

At step 204, the computer interpolates intermediate images in an animation sequence which represent images which are produced from the first image and the second image. Preferably, this is carried out using commercially-available morphing software to morph between the images: from the first facial expression to the second facial expression. The morphing is carried out over a time period equivalent to that required for the word rain to be reproduced. It is also carried out in synchronism with the user saying the word "rain". This results in the user saying the word rain, simultaneously with the morph between the first to the second facial expressions.

By morphing along the path between the various images, an image is obtained corresponding to the audio track.

Of course, this example given above omits two sounds/facial expressions between r & u.

Another aspect of the initial embodiment was to simulate a blink and/or a smile using morphing techniques similar to those discussed above. This used a first image of eyes open ("image 1"), a second image of half-way between eyes open and eyes closed ("image 2"), and a third image of eyes closed ("image 3"). The eye blink is then morphed by morphing image 1→2→3, holding it there, then 3→2→1. The smile can be morphed in a similar way.

This first embodiment required some trial and error, and also produced some distortion of facial features, since the user's features are not terribly natural in this state. This first embodiment, therefore, produced a rudimentary operation with sufficient realism to be usable, but having some problems therein.

Second Embodiment

The second embodiment uses more sophisticated tools to provide processing improvements in the facial expression. It provides geometrical perspective changes as part of the morph between images. The second embodiment also uses tools which allow better registration of the images to produce a more realistic final image.

The second embodiment breaks the speech to be simulated into units—specifically phonemes and/or diphthongs. Diphthongs are a type of phoneme. Images of each unit are obtained, and the system morphs between the obtained images or keyframes.

Phonemes are the primary components of speech. There are many phonemes in the English language, the number of which varies depending on the way they are counted. For purposes of this application, we assume there are about 50 phonemes. In addition to phonemes, human speech also includes diphthongs. The inventors found that people characteristically change different parts of facial expressions—face shape, mouth shape, head shape—in different ways depending on the presence of the phonemes and diphthongs. For the second embodiment, the ways that the face changes were determined by trial and error.

Figure 3:
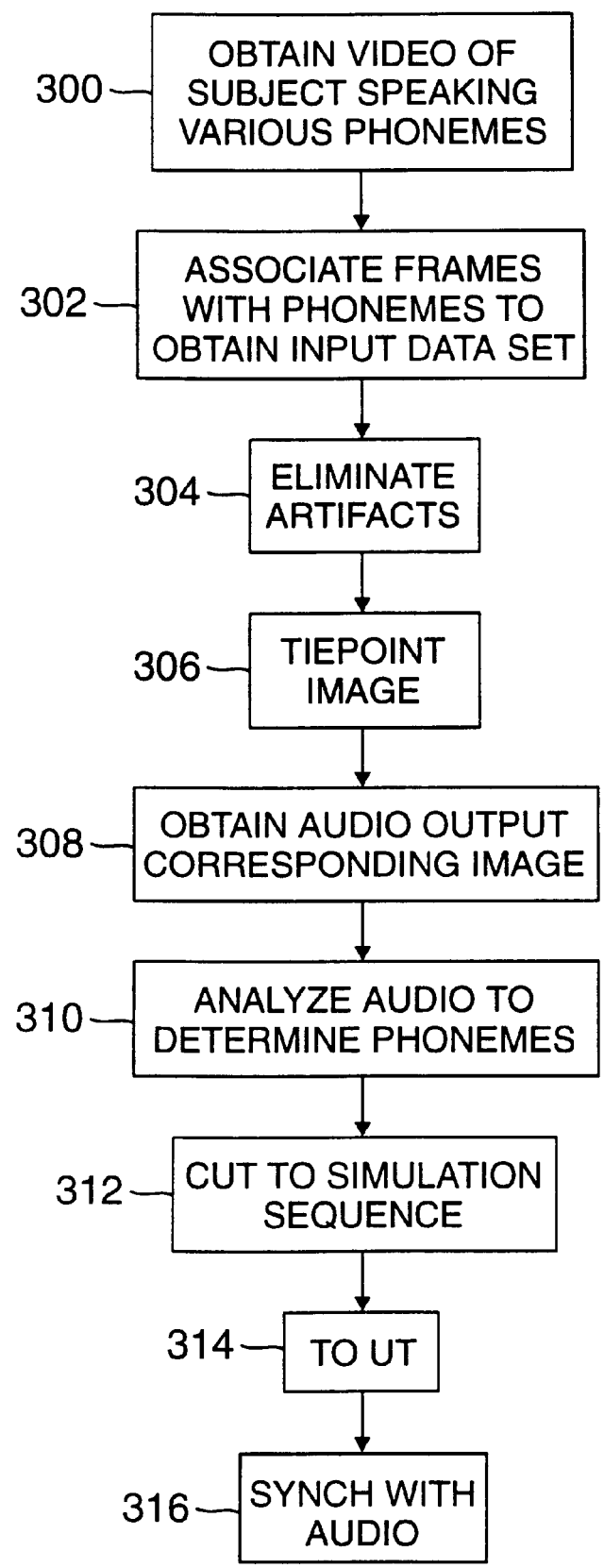
FIG. 3 shows a flowchart of operation of the second embodiment of the present invention.

The process of speech simulation according to the present embodiment carries out the flowchart of FIG. 3. The process begins by acquiring images corresponding to a list of phonemes of the language. Ideally, this is obtained from a video of a person speaking over a certain time. Phonemes are identified within the speech, either by manual manipulation, or by the use of the ABEKAS (TM) video tools available from Abekas Video systems, Inc, Redwood City Calif. Each of the phonemes is associated with a frame that is determined to best fit the phoneme. Each of those frames is then captured, numbered and stored on disk, to form a first database which includes an entire set of phoneme images comprising the input data set, at step 302.

The speaker database is the fundamental representation of the figure to be animated in the output video. The database is a set of pictures of the subject's head/face, each picture having been digitized from the source video of the speaker. The synthesis process as used herein allows for complex combinations of database records to be used in the production of an output picture, thereby increasing the possible output set to combinations of database elements.

The figure is represented in the speaker database as a set of digital picture of an actual person. Each picture is a record in the database. The various records in the database represent articulation of the face over the range of face shapes desired to be reproduced in the synthesized video sequence. For speech-related articulation, each record corresponds to the production of a phoneme. Other records may relate to other facial characteristics such as eyelid motion (open and closed), eyeball look direction (up, down, left, and rights), and emotion.

Figure representation is based on the visible speech model which relates to a set of speech related records of face shape in the speaker database to the production of a spoken phoneme. The input to the model is a sequence of spoken phonemes, the output is a sequence of database records or combination of records that reproduce the correct face shape during phoneme utterance.

The initial visible speech model as described herein expresses this relationship as one-to-one, i.e. each spoken phoneme is represented by one unique face shape in the database. The phonemic coding scheme uses 50 phonemes. The various phonemes which are preferably used according to this embodiment are as shown herein in table 1, but it should be understood that any other definitional organization of phonemes could alternately be used.

TABLE I

| symbol | Example words |
| --- | --- |
| a | wad, dot, odd |
| b | bad |
| c | o in "or", au in "caught", aw in "awe" |
| d | add |
| e | angel, blade, way |
| f | farm |
| g | gap |
| h | hot, who |
| i | long e as in "eve", theme, bee |

TABLE I-continued

| symbol | Example words |
|---|---|
| k | cab, keep |
| l | lad |
| m | man, imp |
| n | gnat, and |
| o | only, own |
| p | pad, apt |
| r | rap |
| s | cent, ask |
| t | tab |
| u | boot, ooze, you |
| v | vat |
| w | we, liquid |
| x | a in "pirate", o in "welcome" |
| y | yes, senior |
| z | zoo, goes |
| A | long i as in "ice", height, eye |
| C | chart, cello |
| D | the, mother |
| E | many, end, head |
| G | length, long, bank |
| I | i in "give", u in "busy", ai in "captain" |
| J | jam, gem |
| K | anxious, sexual |
| L | evil, able |
| M | chasm |
| N | shorten, basin |
| O | oil, boy |
| Q | quilt |
| R | honer, after, satyr |
| S | ocean, wish |
| T | thaw, bath |
| U | wood, could, put |
| W | out, towel, house |
| X | mixture, annex |
| Y | use, feud, new |
| Z | s in "usual", s in "vision" |
| @ | cab, plaid |
| ! | z in "nazi", zz in "pizza" |
| # | x in "auxiliary", x in "exist" |
| * | wh in "what" |
|  | u in "up", o in "son", oo in "blood" |
| + | oi in "abattoir", oi in "mademoiselle" |

Certain substitutions in the last few phoneme characters can avoid confusing the Unix operating system. We suggest:

| aa | cab, plaid |
|---|---|
| zz | z in "nazi", zz in "pizza" |
| xx | x in "auxiliary", x in "exist" |
| ww | wh in "what" |
| uu | u in "up", o in "son", oo in "blood" |
| oi | oi in "abbattoir", oi in "mademoiselle" |

At step 304, the input data set is processed to eliminate artifacts. Various artifacts affect the realism of the final simulated image. According to this embodiment, the removed artifacts include lighting inconsistencies, small amounts of subject motion as the subject is speaking, variations in camera output over time, and the like. These preprocessing operations use well-known image processing functions including histogram equalization, image registration and the like.

The next step in the process tiepoints the images to one another. The tiepointing occurs among various images of the input data set. Tiepointing is the process of matching the specific features in one image with an identical feature in another image—even if that feature is in different locations. For example, the user's eyes, lips, teeth and hair may be tiepointed. This embodiment requires the user to manually select the points to be tiepointed in one image ("the reference image"). The system automatically finds the same tiepoints in all of the multiple images as described herein. The input data set is completely set up once all the images are set and tiepointed.

At step 308, the audio output, to which an image is to be synchronized, is obtained. This can simply be a user recording the audio sequence; it can be synthesized from the original sound/video sample which was used to form the image database. At step 310, that audio is analyzed to determine the phonemes which correspond thereto. One way which this can be done is by obtaining a written transcript of the audio track, and using a computer dictionary to determine the phonemes formed by the words in that written transcript.

At step 312, the determined phonemes are converted into a simulation sequence.

Speech related facial motion in the present invention is based on interpolation of face shapes. Face shapes are stored as a set of control points for each picture in the database. The control points identify the location of facial features for each face shape. Of particular importance to speech are the facial features that vary in the production of speech. The main feature is the mouth, which includes the lips, teeth, tongue, jaw, and cheeks.

The speaker database must contain the set of face shapes over which the face need range to visually simulate speech. The major component of face shapes in the database are, as described above, pictures of the subject speaking a full set of phonemes. The visual appearance of speech is produced by displaying in order and at the appropriate rate a sequence of face shapes based on a phonemic translation of the desired speech. To smooth the motion of the figure, the interval between face shapes is filled with frames synthesized by morphing from the face shape at the beginning of the interval to that at the end.

For example, if the word to be spoken is "Poe", translated as /p/ occurring at time A and /o/ at time B, in the range of time between A and B the mouth will linearly transition from the pursed lip shape the bilabial /p/ to the lip-rounded shape of the /o/. The /p/ picture is displayed at time A, the frames between A and B are synthesized from a linear combination of A and B by morphing, and the /o/ picture is displayed at time B.

The initial visible speech shape model must fully express the face shape of each phoneme. The simulation occurs from linearly interpolating between phonemes. At maximum acoustic expression of the phoneme, the relevant face shape in the speaker database fully controls the face shape in the synthesized output video. Test sequences shows that full visual expression of all phonemes has an unnatural appearance. Visually this results in unnaturally fast, jerky and extreme mouth motion.

The visible speech model is modified to base extent of visual expression on the location of sound production in the vocal tract. Generally, a sequence of phonemes is established that controls the shape of the face. The controlling phonemes are produced mainly by the lips and teeth. Phonemes produced behind the teeth in the mouth cavity affect the shape of the face without controlling it. Phonemes produced behind the vellum have no control or affect on face shape. The affect on face shape is accomplished by establishing keyframes that are a linear combination of face shapes, the major percentage from the controlling phoneme and the minority percentage from the affecting phoneme. This will be discussed further herein.

Sample video sequences have shown that certain phonemes do not have an associated face shape (i.e. face shape is irrelevant to the production of the sound) while others may have influence on face shape without controlling it. Also, visual expression of certain phonemes is sensitive to the context of the preceding and succeeding phonemes.

After the complete processing, a full resolution output data set is generated at step 314, and saved to memory. These output frames are then transferred to the Abekas digital/analog converter and then to video tape at step 314. At step 316, this is synchronized with the audio track.

The following describes the steps of the flowchart of FIG. 3 in further detail. Step 300 is the initial preparatory step of obtaining a video of a subject speaking various phonemes. This video can be obtained from the subject conducting a dedicated session to speak the various phonemes, or by obtaining a video tape showing the subject speaking, e.g. a speech or news broadcast. This source must be converted into a set of phoneme images which comprise the input data set. Ideally, there should be controlled studio-like setting with proper lighting control, consistent video white balance, and a smooth and relatively featureless background. If any of these characteristics are not available, then the database portion should choose images which are as nearly identical in subject position and orientation as possible. Discrepancy between head position and different images causes a less stable final product. However, head movements within plus or minus 5 degrees in any of the three axes of motion still allow a quite acceptable product.

Once an appropriate portion of the video tape is chosen, the frames must be associated with the phonemes of step 302. This is done using the Abekas system. Abekas allows the user to jog through the simulation frame by frame. The user can then determine which of the frames best matches the phoneme. As described above, the best match is usually obtained when the facial features reach their maximum movement. The Abekas software is used to manually scan through the segments to locate images which represent the various phonemes. In this embodiment, the user must manually analyze each phoneme image to ensure that it is the most correct image among the several frames which correspond to the phoneme. That most correct frame is usually the one at which the mouth, teeth, and tongue are at the most extreme positions relative to adjacent images. These most extreme positions enables the best end point for the morphing.

The Abekas system copies appropriate frames into the computer memory. A table is formed in memory, correlating each phoneme to a frame to which it corresponds. When a frame is selected as being representative of a phoneme, that frame number is noted in the table to correspond to the phoneme. A database is accordingly established in memory between the frame number and the phoneme.

Once all phonemes are entered into the database, we have one frame corresponding to each phoneme at Step 302. Step 304 then processes these frames to minimize the artifacts so that the final images will be consistent. Then the morph between the images provides a more realistic final animation. This artifact correction includes color correction and registration.

Color correction is a process of adjusting relative values of the images in the data set to compensate for variations in camera output values. A single image is chosen as a reference image. The remaining data set is manipulated so that its range of values best matches that reference image. This is done by obtaining histograms of various characteristics of the image values, including their color saturation and the like. The color histograms of all the other images are equalized to the reference.

Registration is the process of positionally aligning one image to another. The registration according to the present invention first selects two points which will remain fixed in one image, e.g., the user's eyes and nose. The rest of the data set is then registered to that image by rotating and translating the rest of the images comprising the data set. Other choices of the fixed points include the inside corners of the eyes. This effectively ties each of he images to the same positional system. After completion of this pre-processing, the image is tiepointed at step 306.

Tiepoints are positions—x, y locations in an image—which correspond to a feature in the image. These points are correlated with the same points in another image and "tensioned" with respect to that other image. The tensioning affects the amount of movement of tiepoints that can occur between any images—e.g. a tension of 0 allows unlimited movement while a tension of 1 holds the tiepoints firmly to one another. Suitable examples of tiepoint locations include corners of the eyes, pupils, selective points around the irises, eyebrows, lips, teeth, hair and the like. Any point which is distinct from its nearby region can be used as a tiepoint.

Tiepointing thus allows portions of the images to be associated with one another in a controllable way. Tiepointing is normally carried out on the entire outline of the subject, working around the shoulders, neck and head of the subject. Usually, these head-outline tiepoints will be fairly strongly tied to one another to prevent random bobbing motion of the head as the user speaks. This set of boundary tiepoints must be fairly dense to ensure a good outcome.

The inventors found that the ultimate tiepointing density for these features is every 20 pixels or so.

Additional tiepointing is necessary for those facial features which move during speech. This includes, for example, the eye shapes, mouth shapes, etc. One tiepoint every 5–10 pixels has been found optimum for this.

Teeth, tongue, and eye-balls pose the additional problem of being occluded during portions of the animation. These features are tiepointed with regard to the use of groups to allow them to selectively be made to appear and disappear in a natural fashion.

Finally, we need to tiepoint additional features such as the nose, cheeks, chin, neck and the like to ensure a reasonably uniform set of tiepoints. The synthesizing algorithm, as described herein, triangulates among these points, making it important to tiepoint as many features as possible to assure the best triangulation. This also makes the final product more realistic by ensuring that the features change in a relatively smooth and localized manner. Tiepointing can cause unusual artifacts due to triangulation if the triangles that are used are too large. Too dense a triangulation, in contrast, makes the synthesis creation process slower. 200–300 tiepoints per image has been found by the inventors to be optimum. The preferred technique of triangulation operates as follows.

The triangulation method used in this system is the Cline-Renka Generalized Delaunay Triangulation (GDT). The GDT is a generalization of the standard Delaunay Triangulation (SDT) which can deal with non-convex regions, holes, and edge constraints. The SDT problem can be stated as follows:

Given a (finite) set S of points (nodes) in the plane, determine a set T of triangles such that:
1) The vertices of the triangles are nodes,
2) No triangle contains a node other than its vertices,
3) The interiors of the triangles are pairwise disjoint,
4) The union of the triangles is the convex hull of S, and
5) The interior of the circumcircle of each triangle contains no nodes.

Property (1) is an obvious requirement. Properties (2) and (3) prevent triangles from overlapping. Property (4) ensures that the entire region in question is covered by the triangulation.

Property (5) can be shown to be equivalent to the optimality condition of maximizing the minimum angle in the triangulation over the set of all possible triangulations.

An SDT is equivalent to a Dirichlet tesselation and to a Voronoi diagram. The preferred algorithm for the solution of the SDT is as follows:
1) Create an auxiliary triangle A so that S is entirely contained in A. Add A to T.
2) For each point p in S:
   2a) Find the set T' of triangles whose circumcircle contains p.
   2b) Determine the union of the triangles T', called the "insertion polygon", I.
   2c) Find the outer (boundary) edges of I.
   2d) Create new triangles T" by connecting p to the vertices of I.
   2e) Delete T' from T, and add T" to T.
3) Remove all triangles which share a vertex with A.

Other algorithms for creating the SDT without using an auxiliary triangle exist, but the increased computational complexity was not worth the gain in this case. This other algorithms are usually used when some outside factor prevents the capability of setting up the auxiliary triangle.

Now, having computed an SDT over our set of points S, we want to ensure that certain required edges and boundaries are included in the triangulation. However, if these edges are added to the triangulation by some means, then property (5) will be lost, and the optimality of the triangulation is usually no longer true. Thus, some sort of modified circumcircle property is needed. Note also that if we specify interior boundaries, then property (4) will no longer be true. The following definitions and modifications are made to provide for these boundaries and required edges:

Definition 1: Let B={B_i, i>=1}, where the B_i's are simple, closed polygonal curves in the plane, pairwise disjoint. The line segments composing each B_i are called "Boundary Edges".

Definition 2: Let $\Omega$=closure(interior(B_1) intersect interior(B_2) . . . ).

Definition 3: Let E be a set of "Required Interior Edges". Required interior edges are line segments which connect pairs of nodes. No other nodes lie on the line segment, and the line segments are interior to $\Omega$.

Now, E union B constitutes the set R of "Required Edges".

We can now modify the circumcircle test, property (5), by weakening it as follows:

5') For any triangle t in T, if some node is contained in the interior of the circumcircle of t, then that every interior point of the triangle t is separated from that node by a required edge.

This means that a triangle can pass the circumcircle test even if some node is inside its circumcircle, but only if the node in question lies "on the other side" of some required edge, i.e., the triangle is on one side of a required edge, and the required edge is one side of the triangle, and the node in question lies on the other side of the required edge.

We now have the following Generalized Delaunay Triangulation (GDT) problem to solve:

Given a (finite) set S of points (nodes) in the plane, a set of polygonal boundary curves B which define $\Omega$, and a set of required edges E, determine a set T of triangles such that:
1) The vertices of the triangles are nodes
2) No triangle contains a node other than its vertices
3) The interiors of the triangles are pairwise disjoint 4') The union of the triangles is $\Omega$
5') If any node is contained in the interior of the circumcircle of a triangle, then every interior point of the triangle is separated from the node by an element of R=E union B
6) Each element of R is an edge of at least one triangle.

And the Cline-Renka solution to the GDT is as follows:
1) Determine the SDT, T
2) For each edge e in R, call add_edge(e, T, R)
3) Delete all triangles with interiors exterior to $\Omega$ Procedure add_edge(edge e, triangulation T, required_edge_list R)
1) Find the triangles in T whose interior intersect edge e
   1a) If no such triangles exist, stop; else, remove all such triangles from T
2) Let:

$\Omega\_e$ = set of all triangles of step 1

$B\_e$ = boundary edges of $\Omega\_e$ $R\_e$ = any required edges in $\Omega\_e$ nodeset = set of nodes in $\Omega\_e$ other than endpoints of e $a, b$ = endpoints of e 3) Retriangulate the "left" side of the required edge e retriangulate(nodeset, a, b, T, R_e union B_e)
4) Retriangulate the "right" side of the required edge e retriangulate(nodeset, b, a, T, R_e union B_e)
5) Replace R with R union e
and the real work occurs in:
Procedure retriangulate(list nodeset, point p1, point p2, triangulation T, required_edge_list R)
1) Find all the nodes strictly left of the line (p1,p2), which are not separated from the midpoint of the line (p1,p2) by some other required edge. Denote this set X.
2) Find the node x in X that maximizes the angle p1-x-p2.
3) Add the triangle (p1,x,p2) to T
4) Delete x from nodeset
5) If the line from p1 to x is not in R, retriangulate(nodeset, p1, x, T, R)
5) If the line from x to p2 is not in R, retriangulate(nodeset, x, p2, T, R)
Conceptually, this operates as follows.
1) Compute an SDT
2) For each edge that has to be added, create an insertion polygon for that edge, along with some assorted arrays of nodes, etc.
3) Find all the points in the insertion polygon that are strictly left of the edge, and retriangulate so that the modified circumcircle test will be met. Then, using the two new sides of the triangle just created, recursively retriangulate the remaining points.
4) Do the same thing for all the points that are strictly right of the edge.
5) Clean up by removing any exterior triangles. This completes the triangulation.

After the tiepoints are selected for one particular image, a matching algorithm applies these same tiepoints to the other images. This embodiment carries out the matching by investigating the corresponding locations in the other images. The pixel areas around these corresponding locations are then correlated against the pixels forming the tiepoint in the originally tiepointed image. The best correlation between areas is taken as the corresponding tiepoint.

The matching algorithm is at least 90% effective in selecting locations of the features in the images. Ideally, therefore, each of the images in the database should be investigated to ensure that the matching algorithm has properly placed the tiepoints. This is preferably done manually.

Preferably, a table stores information about the tiepoints, including a tiepoint identifier, which can be a number, for example, and the x,y coordinates of that tiepoint. The tiepointed image is displayed as the image, overlaid with the tiepoints from the table. The operator then investigates the image to manually determine if the tiepoints are placed in their proper locations. If not, a tiepoint editor can be used to change the x,y coordinates for each tiepoint. In its simplest embodiment, the tiepoint editor is simply an editor which calls up the table and changes the x,y information associated with one of the tiepoints therein.

Once the tiepoints have been established for each image, the database has been established. This database can now be used to produce a simulation or animation, sequence. See step 312 at FIG. 3. This is done using a tool that the inventors have called "the animator". The animator uses the various databases to produce an animation sequence of the user speaking using the tiepoint images, and the phoneme images.

The animation is defined by keyframes at specific points in time. Each keyframe is a point in time which is described fully. All times between keyframes are not described fully; they are simulated images that are simulated from parts of the keypoint, or known, images.

The keyframes can be defined from one image or from multiple superimposed images. The keyframes also include a plurality of tiepoints in the image.

The animation follows a path between keyframes. That path is interpolated between the known data which exists at the keyframe. The same path may be used for both the images and the tiepoints or alternately separate paths may be used.

For example, some sounds, such as "p" affect the shape of the face. This causes the positions of the tiepoints forming the face shape to change. The "ha" sound causes the face look to change, and affects the throat shape. The "a" sound comes from the middle of the mouth. These sounds and their associated shapes show that different sounds affect different face/mouth parts etc, differently. The paths of the tiepoints and the images therefore differ for these elements.

It is often useful to have several images at each keyframe. The portion of each image to be used at a particular keyframe can be defined. Different combinations of images and tiepoints at given times vary the realism and the look of the final animation. The final image is formed of a linear weighted combination of the images.

The tiepoint tensioning and pathing allows different portions of the animation to be separately controlled. The eyes can be moved independently of the mouth, for example. The animation begins by defining a path. For example, the best path may be a path for the head.

Figure 4:
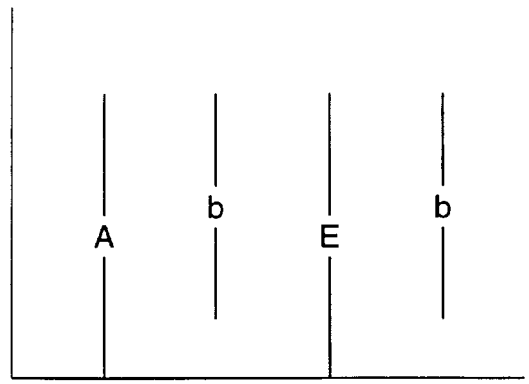
FIG. 4 shows a sample path editor without interpolation.
Figure 5:
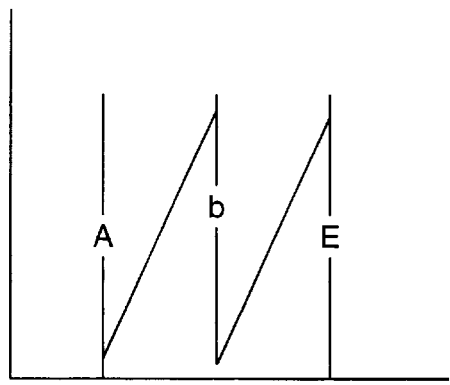
FIG. 5 shows an example animation between keypoints.

An example path editor screen is shown in FIG. 4. This path editor screen, shows a timeline of the animation. The initial timeline is shown in FIG. 4 with each of the keyframe times being shown for each of a plurality of phonemes. A simple animation between the images a, b, E, etc. is shown in FIG. 5.

As described above, multiple images can be used at a keyframe. This is done by selecting multiple images for a keyframe and the relative proportions of the images at the keyframe. If there are several images, the lines connecting the images represent the various phonemes which will be combined.

One additional tiepointing feature is the boundary/grouping operation. The boundary/grouping operation of the present invention begins with a completely tiepointed database. The images and tiepoints are grouped by defining boundaries for each group.

For this first embodiment, each of the defined groups include all of the tiepoints in the database, obviating the need to specify which tiepoints are in each group. The boundary of the group allows the morphing and animating software to automatically exclude portions of the image which are outside of that boundary.

Figure 6:
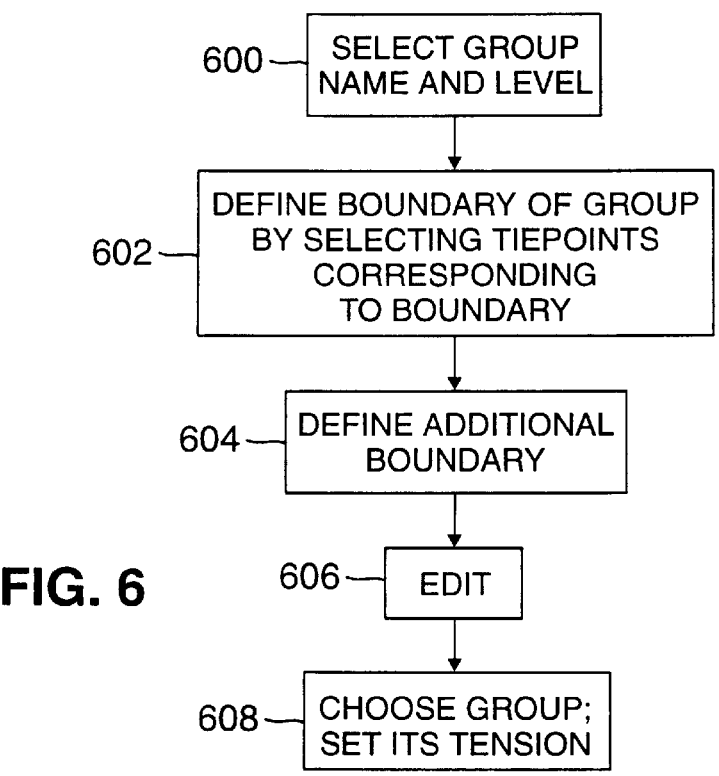
FIG. 6 shows a flowchart of operation of the grouping.

According to the present invention, each of the boundaries includes a group name and a group level. Lower-numbered levels take precedence over higher numbered levels in making the final image. We will give herein an example of the group "head", level 0. " FIG. 6 shows the flowchart of operation.

As explained above, we begin by selecting the group name and group level at step 600. For this example we have chosen "head" as the name and 0 for the group number.

At step 602, we define the boundary of the head group by selecting the tiepoints in the tiepointed image which correspond to the boundary of the head. This boundary should be a closed surface which encloses various points. Additional boundary curves are preferably defined at step 604; and the group is therefore defined between an inner boundary curve and an outer boundary curve.

The first boundary is preferably the outside of the head, with the second boundary excluding the eyes and mouth. The multiple boundaries define a group wherein the morphing algorithm excludes all areas outside of the outer boundary and they also excludes all areas inside the inner boundary.

Figure 7:
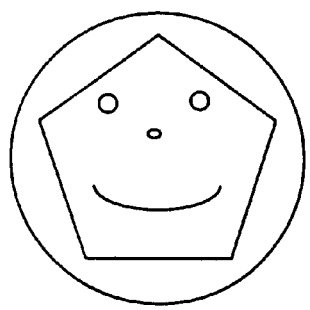
FIG. 7 shows a plurality of points defining a boundary.
Figure 8:
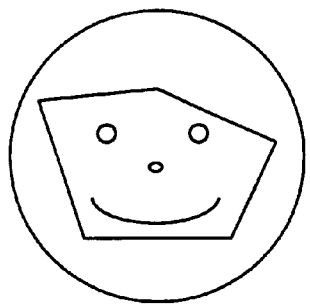
FIG. 8 shows an additional point added to the boundary, and the effect that adding this additional point has on the boundary.

The boundary is stored in memory as a series of points defining the area therein. The computer determines a connection between the points, preferably a plurality of separated line segments, to define the boundary. These points, and hence this boundary, may also be edited at step 606 to add additional points, for example. FIG. 7 for example, shows a selected boundary comprising a plurality of tiepoints. To change this boundary, an additional point has been added in FIG. 8. Points may also be deleted in this same way.

Next, other groups may be added, such as an eye group or the like.

The purpose of these groups is to allow various parts of the image to be animated independently of the other parts. In order to do this, the boundaries of these groups must match throughout the animations. In addition, certain points of the subject must be held still during the animation.

For example, holding the shoulders still during the animation makes a more realistic product.

Tensions for the groups are defined beginning at step 608. These tensions are numerical values between 0 and 1 as described above. The value of the tensions determine how closely a tiepoint is held to either a reference image or a reference path. Each group is defined to have a separate tension and a separate reference path. However, the boundaries between groups must be held to a common path or else gaps would appear between the groups during the morphing process. Therefore, tension values may be assigned to the outer edges of the boundary to maintain that boundary line.

Normally we set the lower shoulder tiepoint values and groups close to 1.0 in order to keep the shoulders from moving in an unnatural fashion during talking. We then proceed up the shoulders towards the neck where we set tension values progressively lower. Most of the other tiepoints are set to 0.0 or another low value, since movement of these other tiepoints makes the animation more lifelike.

The groups and tension files in the tiepointer can also be used in the animator. An example is set forth herein. We use the example discussed above—creating two groups: one for the head with a boundary surrounding the entire head but excluding the eyes, and a boundary around the eyes. Another group includes the eyes—with the outer boundary being at the same boundary as within the head group. Preferably we set the head group at or close to level 0, and the eyes group at or close to level 1. This means that the head morphing will be overlaid onto the eye morphing. More generally, the layers are overlaid in order from back to front, higher to lower. The head does not cover the eye group since the inside boundary of the head leaves a hole through which the eyes can be seen.

In order to create a lifelike image, we must hold those tiepoints to the path to which the head is being morphed. Even if the eye group has its own path which is completely independent of the phonemes which are being synthesized, the boundaries will still match up. This is important, since the eyes can and do move entirely independent of the mouth. Of course, we can set the boundary points to 1.0 in both groups, in which case the head and the eyes will be held to completely separate paths.

Third Embodiment

Certain aspects are further improved in the third embodiment.

First, the third embodiment further improves the tiepointing by improving the automated matching operations between images once tiepoints are chosen.

Each of the matching operations attempts to determine the location of the best match between images by comparing a small region around each original tiepoint in the original image with similarly-shaped regions in the target images. A correlation between the two regions is computed and the center of the specific region with the best correlation being used as the matched tiepoint location. A number of preferred techniques effect the matching operation.

A first technique computes integer pixel matching. This is the fastest but least-accurate technique. This technique computes the correlation between regions of different images by using only integer movements within the correlation area. This technique is therefore accurate to only a single pixel.

The other correlation operations are labelled as models 0–4 are various implementations of the so-called Gruen Subroutine.

This is a discussion of the different correlation options supported under the Gruen subroutine. Five options exist, called modes 0 to 4. Each option will be discussed below.

Mode 0

This mode corresponds the closest with what most people consider to be correlation. In this case the template is kept on integer pixel boundaries and is matched to each possible pixel location in the search area. That integer location which matches the best is selected for the next step. In order to return a sub-pixel location, the correlation values of points on a column and a row through the best match point are fitted to a quadratic and the peak of the quadratic is selected and returned in both sample and line. Since the correlation is never actually performed at the sub-pixel location, the returned values are only estimates. The returned correlation value is still that determined at the best integer location. If the peak correlation occurs at pixel i and has an amplitude f(i), then the location of the interpolated peak is computed from $$x = i - \frac{1}{2} \frac{f(i-1) - f(i+1)}{2f(i) - f(i-1) - f(i+1)} \tag{1}$$

and similarly for y.

Execution time per tiepoint depends upon the template size and the search area size. For a typical area it requires a normalized time of 1.0.

Mode zero is the mode of choice when one knows:
1. The rotation and scale differences between the template and the search area are minimal.
2. That the location of the best correlation could be anywhere in the search area.
3. That accuracy is never required to exceed 1/10 of a pixel.
4. That time is of the essence.

Mode 1

This mode makes use of simulated annealing to arrive at the best correlation location. This is the slowest of all options computationally, and the most experimental. It was provided as a means of last resort when other options have been exhausted and a correlation is still required.

The method uses guessing the six polynomial coefficients to an affine transformation which maps the template onto the search area. Any mapping is acceptable provided it remains within the search area. Each guess adds to the last location six values obtained from a random number generator constrained to remain within a certain range or "temperature". Temperature, here, is a metaphor borrowed from the source of the title for this method, "Simulated annealing." Annealing is "heating and then cooling to . . . ". In this case the temperature refers to the range of numbers used. As the temperature of the mathematical system is lowered, it settles upon a solution to the six parameter equation. If the system is cooled too fast, it may yield an incorrect answer.

Gradually the temperature is reduced so that guesses remain more localized. The heart of the technique is to compute, at each step, the Boltzmann probability of transition from the previous correlation to the current one. If the current correlation is higher than the last then we adopt the new affine position. If it is lower we compute the probability of that transition and compare it with chance. This is analogous to accepting the transition if the coin comes up, and rejecting the transition if the coin comes down. The essence of annealing is that it gives us a way of escaping from local false minima in the solution space. Thus, this can be considered as a non-deterministic method because the next move is not constrained entirely by the last move. Unlike Mode zero, Mode 1 does not systematically search the solution space for all combinations of mappings. It starts at an initial estimate and bounces about trying all sorts of combinations of affine mapping while remembering the best location visited. Repeatedly it is forced to revisit the best correlation location. Gradually the angle of guesses is reduced until it freezes near the best minimum. If the number of iterations is kept small it will freeze at the wrong location. If the number of iterations is kept large the best correlation location will always be found but at the expense of time. Several thousand iterations should be used.

This mode requires more arguments than any of the others. It requires the Gruen the input mapping polynomial coefficients Line_coef_limits and Samp_coef_limits; the temperature ranges on each of the coefficients Line_temp and Samp_temp; and the iteration limit Limits.

Execution time per tiepoint depends upon the template size and the number of iterations. For a typical area it requires normalized time of 14.0.

Mode one is the mode of choice when one knows:
1. That these is an unknown amount of rotation, scale, or distortion between the template and the search area.
2. That the location of the best correlation could be anywhere in the search area.
3. That if the images are distorted this distortion is to be compensated.
4. That accuracy is never required to exceed 1/30 of a pixel. Actually the user can control this precision.
5. That time is unimportant in exchange for a tiepoint.

Mode 2

This mode uses the simplex downhill search strategy. A simplex is a tetrahedron with one corner greater than the dimension of the problem or surface it resides on. In this case the surface is one where the correlation value is a function of six dimensions, those of the six affine mapping coefficients. These coefficients map the template to the search area. We seek the six coefficients which map the template to the search area, and for which (1− the correlation) is a minimum. The simplex stands on the surface. There are four rules describing permitted changes in shape for the simplex as it seeks to move along the surface towards a minimum. Eventually it will find the bottom of the correlation surface and will compress itself down to the desired precision. This is a deterministic method because the next move depends entirely upon the last.

Deterministic schemes have the drawback that if they start in the wrong minimum they have no means of escape. Therefore, the initial estimate for the affine mapping polynomial must be within the correct minimum for Mode two to function correctly. The user can control the starting location for the search but this only sets two of six affine coefficients. In most cases the driving program provides initial estimates for a unity mapping. This is adequate if the initial tiepoint is within the correlation distance. If data were strongly distorted, however, it might not suffice. Mode two does not search the entire search area. It begins at one location and events guide it from there.

This mode requires an input estimate of the mapping polynomial, arguments Line_coef, and Samp_coef in Gruen.

Execution time per tiepoint depends only upon the template size. For a typical area it requires a normalized time of 1.0.

Mode two is the mode of choice when one knows:
1. That if there is rotation, scale, or distortion between the template and the search area that initial mapping polynomial coefficients are available to begin a search within the correct minimum.
2. That the initial tiepoint location is within a few pixels of the true one.
3. That as much accuracy is desired as possible.
4. That if the images are distorted this distortion is to be compensated.
5. That time is important but subordinate to accuracy.

Mode 3

This is hybrid mode. In this case Mode zero is first used to determine the tiepoint location. This location is then passed on to Mode two along with a unity mapping transformation. Since Modes zero and two are comparable in execution time, this is a good combination. It provides broad search and great precision in the result.

Execution time per tiepoint depends upon the template size and the search area size. For a typical area it requires a normalized time of 1.8.

Mode three is the mode of choice when one knows:
1. That the location of the best correlation could be anywhere in the search area.
2. That the amount of rotation, scale, and distortion between the template and the search area is slight.
3. That accuracy is essential.
4. That time is important.

Mode 4

This is also a hybrid mode. In this case Mode one is used first to determine the mapping coefficients. These coefficients are then passed to Mode two which refines the solution. This combination provides great precision along with the minimum of a priori knowledge on the part of the user.

Execution time per tiepoint depends upon the template size and the number of iterations. For a typical area it requires a normalized time of 16.0.

Mode 4 is the mode of choice when one knows:
1. That the location of the best correlation could be anywhere in the search area.
2. That the amount of rotation, scale, and distortion between the template and the search area is substantial or unknown.
3. That accuracy is essential.
4. That time is unimportant.

The Object Function

Each of the five correlation modes discussed above is really a means for determining the location in an image where some quantity, which we call correlation value, is a maximum. This quantity is computed in the same fashion for all modes and is itself mode independent. Since it is a scalar to be optimized, it really is an objective function. Gruen uses a least squares objective function called the coefficient of determination. It measures the quality of a least squares linear fit made between the intensity values of the template and the corresponding intensities in the search area as determined by the affine mapping polynomial. This objective function value lies between 0.0 (no correlation at all) to 1.0 (correlation or anti correlation), and is returned as argument Quality is subroutine Gruen. The correlation quality is computed from $$r^2 = \frac{\left(\sum xy - \frac{\sum x \sum y}{mn}\right)^2}{\left(\sum x^2 - \frac{(\sum x)^2}{mn}\right)\left(\sum y^2 - \frac{(\sum y)^2}{mn}\right)} \quad (2)$$

where x and y are the intensity values in the template and the search area respectively. Note that because the measure is a least squares determination, correlation quality is indifferent to intensity differences between the template and the search area which are of the nature of scale, offset, or complement. Anti-correlations are just as valid as correlations since both imply non randomness.

All modes except Mode O permit the template to suffer a distortion compared with the search area. The nature of the distortion is anything that a first order polynomial or affine transformation can do. There are six coefficients involved, three for sample and three for line. The modes one through four are concerned with determining these six coefficients. By varying the coefficients, one can simulate changes in offset, scale, rotation, skew, transpose, or flip. Since we are really interested in the tiepoint location, we only want the offset term in the sample and the line equations, however, we need to compute all the terms in order to extract the desired terms.

The third embodiment also allows adding small rotational movements to the images associated with the synthesized speech to thus create a more realistic change in perspective while simulating usual head movement. This provides a simulation of depth information and allows tiepoints to be moved along the Z-axis e.g. to include depth information added therein.

Depth information may be added to either a single tiepoint or to a group of tiepoints by selecting the tiepoint or group and selecting the amount of depth information to be added therein.

The rotation information is added by simulating the look of an image rotation. Assuming the head is the shape being simulated, we need to model the three dimensional shape of the head. This model tells us the two dimensional look of the head shape when looking from the front of the head, and from various angles.

Now, we added some random rotational movements to the head to make it look more natural. Most speakers move and slightly rotate their heads when speaking. Random movements in the z direction therefore help the realism. These z movements change the shape of the head according to the model described above.

If there is depth information added to the tiepoint data, then rotations can be added to the final animation. According to this embodiment, translations can also be added to the final information whether or not depth information is present. According to this embodiment, some rotation is defined on the x, y, and z planes. Usually the same "curves" indicative of the rotation are used for every group. The rotation should be kept below approximately+ or –5 degrees. Any further rotation results in artifacts.

As described above, the images are only fully defined at the times referred to herein as keyframes. Between the keyframes, the images are interpolated along the path. The first and second embodiments linearly interpolate between the keyframes, using morphing techniques. As described above, multiple images may be defined at any one keyframe, and the outputs would correspond to summations of these images.

Figure 9:
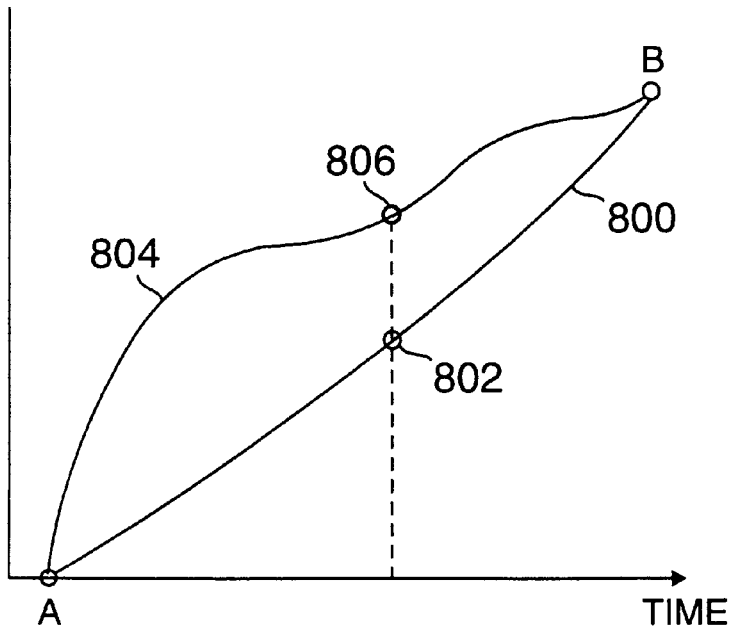
FIG. 9 shows a non-linear animation path between keypoints.

FIG. 9 shows the advanced animating features available according to this embodiment. These advanced animating features enable a non-linear interpolation between keyframes: essentially the "morph" becomes non-linear. One example of such a non-linear morph is shown in FIG. 9.

Non-linear interpolation may also be used for motion. More specifically, the spline-based paths are used to control translation and rotation of groups. The linear paths are used to control the tiepoint and images transitions. Non-linear interpolation is defined in terms of the tiepoints and images in that extra keyframes which can be inserted between the keyframe associated with phonemes to provide for non-linear paths that are piece-wise linear.

The first and second embodiments operate according to path 800, a linear morph between keyframe A and keyframe B. At the 50% point between keyframe A and keyframe B, point 802, the image is composed of half of the keyframe A and half of the keyframe B. This produces a smooth transition between images, and has many advantages. However, one problem with this system is the signature that it leaves on the final product. If one were to investigate the frames, one would find a linear transition between keyframe images. Such linear transitions would be very unlikely to occur in nature.

The non-linear transition according to the third embodiment therefore enables a non-linear morph between images. An example non-linear morph is shown as path 804. This path can follow any function whatsoever or can be entirely random. At the 50% point between keyframes A and B, point 806, the image is much closer to B than it is to A. If one investigates the images between keyframes, one finds a non-linear pattern which can be, for example, random.

According to this embodiment, additional post-processing is possible in the output frames. This can be used to add in background images, color corrections, blur the edges or add noise or the like in order to improve the realism of the final product.

One technique which the inventors have found to be very useful in improving the final product is to add gaussian noise to the image. This decreases the quality of the final image. However, unexpectedly, it also makes the image look more realistic by hiding some of the image parts that detract from its realism.

The gaussian noise which is used as a pseudo random gaussian noise produced, for example, by a UNIX computer. A window size for the gaussian noises is selected, and the noise width is set via a convolution kernel. The size and pixel spreads out based on the noise width, with the noise strength representing the amplitude of the noise.

A "composite" function blends the foreground image with a background image based on an alpha value of the foreground image. This is used, for example, if the background that was used in the original production is not sufficiently suited for the animation. Some backgrounds would show, for example, the movements necessary to register the images. The composite function can be used to remove the existing background, and substitute a new background therefor.

The composite function assigns alpha ($\alpha$) values to more than one image. The alpha channel defines the amount of transparency of an image. An alpha image with a value of 0 is not transparent. Therefore, by setting the head and shoulders to an alpha value of 0, the head and shoulders will always show over a background image. The background itself is set to an alpha value of maximum here, $2^8$=255. This alpha value renders the background completely transparent. Therefore, everything behind this image can be seen through the transparent image.

The composite function then carries out a linear addition of pixels. A non-transparent pixel always shows through a transparent pixel. This allows the background image to be added outside the set boundaries.

Another advanced feature in the third embodiment is the ability to control the attack and decay of the face shapes. Face shapes change during speech. The face shape is defined by the outer parameters of the head; thus the image defined by the outer parameters of the head changes during the morph between keypoints. According to this aspect of the invention, the face shape changes according to an attack and decay function. Each face shape changes toward its destination face shape with an attack function. It changes away from its destination shape following a decay function.

The third embodiment also uses a defocus function, which applies a convolution to the input image in order to produce a blurring or defocusing affect.

The edge blur function applies a convolution similar to that of defocus but only to the edges of the foreground image. The defocus function applies a convolution to the input image to produce a blurring or defocusing effect.

Based on the initial visible speech model, a full speaker database was produced and a set of animations was synthesized to demonstrate the resulting level of realism. An analysis of the results and examination of the database revealed that diphthongs are not adequately represented by a single face shape and that the database contains redundancies in face shape.

The production of a diphthong acoustically is a glide between two sounds. The start and end sounds are approximately that of two vowels, as a plot of F1 versus F2 formants clearly shows. Thus, visually, the shape of the face must also be represented as a glide between two face shapes. The visible speech model was extended to include representation of diphthongs as a glide between two face shapes, represented by the records in the speaker database corresponding to the production of the relevant two vowels. Sample video sequences were produced to test this hypothesis; the result was more realistic expression of the face shape to accompany the sound of a diphthong.

The speaker database of face shapes contained obvious redundancies. Two approaches to reducing the redundancies have been considered. First, eliminate redundancies based on characteristics of productions such as voiced/unvoiced pairs and location in vocal tract. Second, categorize the face shapes and eliminate commonality. Sample video sequences were synthesized based on substitution of voice/unvoiced pairs with no appreciable visual difference. Reduction based on categorized face shapes have not yet been tested.

Other tools can also be used to improve the realism of the final image.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed:

1. A method of producing a simulated facial image to accompany a unit of speech to be played, comprising:

obtaining a plurality of video segments, each said video segment being a complete image of at least part of a video scene representing said part of a subject speaking a phoneme of speech;

forming a database of said plurality of video segments, with each record addressed by one of said phonemes, and each record representing a video segment that corresponds to said one phoneme;

identifying at least one tiepoint in each video segment representing a specific feature in said video segment and registering said at least one tiepoint to a corresponding tiepoint representing the identical specific feature in another video segment;

obtaining a sample of speech;

identifying phonemes in said sample of speech;

obtaining video segments corresponding to at least a plurality of said phonemes in said said sample of speech;

using said tiepoints to register features of the subject in said video segments; and synthesizing images between said video segments, to produce a simulated facial image of said subject speaking said sample of speech; and equalizing background lighting between said video segments.

2. A method of producing a simulated facial image to accompany a unit of speech to be played, comprising:

obtaining a plurality of video segments, each said video segment being a complete image of at least part of a video scene representing said part of a subject speaking a phoneme of speech;

forming a database of said plurality of video segments, with each record addressed by one of said phonemes, and each record representing a video segment that corresponds to said one phoneme;

identifying at least one tiepoint in each video segment representing a specific feature in said video segment and registering said at least one tiepoint to a corresponding tiepoint representing the identical specific feature in another video segment;

obtaining a sample of speech;

identifying phonemes in said sample of speech;

obtaining video segments corresponding to at least a plurality of said phonemes in said said sample of speech;

using said tiepoints to register features of the subject in said video segments; and synthesizing images between said video segments, to produce a simulated facial image of said subject speaking said sample of speech; and wherein said synthesizing comprises a nonlinear interpolation between said face shapes representing each two phonemes.

3. A method as in claim 1, wherein said using tiepoints uses between one of eye corners, eye parts, teeth, or hair.

4. A method of producing a simulated facial image to accompany a unit of speech to be played, comprising:

obtaining a plurality of video segments, each said video segment being a complete image of at least part of a video scene representing said part of a subject speaking a phoneme of speech;

forming a database of said plurality of video segments, with each record addressed by one of said phonemes, and each record representing a video segment that corresponds to said one phoneme;

identifying at least one tiepoint in each video segment representing a specific feature in said video segment and registering said at least one tiepoint to a corresponding tiepoint representing the identical specific feature in another video segment;

obtaining a sample of speech;

identifying phonemes in said sample of speech;

obtaining video segments corresponding to at least a plurality of said phonemes in said said sample of speech;

using said tiepoints to register features of the subject in said video segments; and synthesizing images between said video segments, to produce a simulated facial image of said subject speaking said sample of speech; and matching image color by determining color histograms to two video segments, and matching said color histograms.

5. A method of producing a simulated facial image to accompany a unit of speech to be played, comprising:

obtaining a plurality of video segments, each said video segment representing a plurality of frames of video of a subject speaking a phoneme of speech;

forming a database of said plurality of video segments, with each record of said database addressed by one of said phonemes, and representing a video segment that corresponds to said one of said phonemes;

obtaining a sample of speech;

identifying phonemes in said sample of speech;

obtaining a first group of video segments corresponding to at least a plurality of said phonemes in said speech;

selecting frames from said each of said first group of video segments which are best representative of associated phonemes, based on other phonemes in said first group of phonemes, to form a first group of frames;

determining a plurality of tiepoints in each frame which have corresponding locations in other frames;

aligning said frames using each of said plurality of tiepoints;

determining an image aspect of each frame, and equalizing said image aspect to a corresponding image aspect in other frames; and interpolating between said frames to form a simulated video segment.

6. A method as in claim 5 wherein said image aspect is color balance, and said determining is by using a histogram of colors.

7. A method as in claim 5 wherein said image aspect is lighting.

8. A method of producing a simulated video to accompany a unit of speech to be played, comprising:

obtaining a plurality of video segments, each said video segment representing video information of a subject speaking a phoneme of speech;

forming a database of said plurality of video segments associated with said phonemes;

obtaining a sample of speech;

identifying phonemes in said sample of speech;

classifying the identified phonemes into face-shape indicating groups depending on an amount by which each said phoneme affects face shape, including an effect of a preceding phoneme and succeeding phoneme;

selecting a first group of video segments from said database based on said phonemes identified in said sample of speech;

modifying at least some of said first group of video segments based on results of said classifying to form a second group of video segments; and using said second group of video segments to form an overall video segment indicating said sample of speech.

9. A method as in claim 8, further comprising determining a plurality of tiepoints in each video segment which have corresponding locations in other video segment;

aligning said video segments using each of said plurality of tiepoints.

10. A method as in claim 8 further comprising:

determining some image aspect of each frame, and equalizing said aspect to other frames.

11. A method as in claim 10 wherein said aspect is color balance, and said determining is by using a histogram of colors.

12. A method as in claim 10 wherein said aspect is lighting.

\* \* \* \* \*

UNITED STATES PATENT AND TRADEMARK OFFICE
CERTIFICATE OF CORRECTION

PATENT NO.    : 6,097,381
DATED         : AUGUST 1, 2000
INVENTOR(S)   : KENNETH C. SCOTT, DAVID S. KAGELS, STEPHEN H. WATSON AND MATHEW C. YEATES

It is certified that error appears in the above-identified patent and that said Letters Patent is hereby corrected as shown below:

In column 1, before FIELD OF THE INVENTION, insert the following:

--STATEMENT AS TO FEDERALLY-SPONSORED RESEARCH

U.S. Government may have certain rights in this invention pursuant to Nasa contract number NAS7-1407.--

Signed and Sealed this

Twenty-fourth Day of April, 2001

*Attest:*

NICHOLAS P. GODICI

*Attesting Officer*     Acting Director of the United States Patent and Trademark Office